(12) United States Patent
Choi et al.

(10) Patent No.: US 7,678,851 B2
(45) Date of Patent: Mar. 16, 2010

(54) NANOCOMPOSITE THERMOPLASTIC RESIN COMPOSITION WITH FLAME RESISTANCE

(75) Inventors: Young-Ho Choi, Seoul (KR); Sung-Ho Lee, Seoul (KR); Yong-Yeon Hwang, Daejeon (KR); Chan-Hong Lee, Daejeon (KR)

(73) Assignee: LG Chem, Ltd. (KR)

( * ) Notice: Subject to any disclaimer, the term of this patent is extended or adjusted under 35 U.S.C. 154(b) by 141 days.

(21) Appl. No.: 11/571,384

(22) PCT Filed: Feb. 22, 2005

(86) PCT No.: PCT/KR2005/000474

§ 371 (c)(1),
(2), (4) Date: Dec. 28, 2006

(87) PCT Pub. No.: WO2006/004245

PCT Pub. Date: Jan. 12, 2006

(65) Prior Publication Data

US 2007/0225411 A1  Sep. 27, 2007

(30) Foreign Application Priority Data

Jul. 2, 2004 (KR) .................. 10-2004-0051560
Feb. 17, 2005 (KR) .................. 10-2005-0013112

(51) Int. Cl.
*C08K 5/3477* (2006.01)
*C08K 5/3492* (2006.01)

(52) U.S. Cl. .................. 524/100; 524/101
(58) Field of Classification Search ........ 524/100, 524/101

See application file for complete search history.

(56) References Cited

U.S. PATENT DOCUMENTS

| 4,987,185 A * | 1/1991 | Aoki et al. ........... 525/66 |
| 6,448,879 B1 | 9/2002 | Kitamura |
| 6,750,282 B1 | 6/2004 | Schall et al. |
| 2006/0122308 A1 * | 6/2006 | Wermter et al. ....... 524/445 |

FOREIGN PATENT DOCUMENTS

| JP | 2001-200135 | 7/2001 |
| KR | 1020000014172 A | 3/2000 |
| KR | 10-2004-0053621 | 6/2004 |
| WO | 99/16828 | 4/1999 |

\* cited by examiner

*Primary Examiner*—Kriellion A Sanders
(74) *Attorney, Agent, or Firm*—Cantor Colburn LLP

(57) ABSTRACT

The present invention relates to a nanocomposite thermoplastic resin composition with flame resistance comprising a basic resin mixture, which comprises a rubber-modified styrene-containing graft copolymer, a thermoplastic polyamide resin and a styrene-containing copolymer, a compatibilizer, a melamine based flame retardant and an organic layered silicate. The nanocomposite thermoplastic resin composition of the present invention offers superior flame resistance without comprising a halogen based flame retardant.

8 Claims, No Drawings

NANOCOMPOSITE THERMOPLASTIC RESIN COMPOSITION WITH FLAME RESISTANCE

TECHNICAL FIELD

The present invention relates to a nanocomposite thermoplastic resin composition with flame resistance comprising a basic resin mixture, which comprises a rubber-modified styrene-containing graft copolymer, a thermoplastic polyamide resin and a styrene-containing copolymer, a compatibilizer, a melamine based flame retardant and an organic layered silicate.

BACKGROUND ART

The rubber-modified styrene-containing graft copolymer is widely used for electric/electronic products and office equipments because of its superior processability, physical properties, appearance and impact strength. And, the polyamide resin is used for machinery parts and electric/electronic materials because of its superior mechanical, thermal and chemical properties. Thus, a synergic effect of the two materials, that is, the moisture resistance and dimensional stability of the styrene-containing graft copolymer and superior mechanical, thermal and chemical properties of the polyamide resin, can be obtained when they are blended.

Because electric/electronic products and office equipments are exposed to a lot of heat, the resin used for them should have flame resistance.

It is known that use of a halogen based compound as flame retardant is the most effective way to male the rubber-modified styrene-containing graft copolymer flame resistant. Typical halogen based flame retardants are tetrabromobisphenol A, brominated epoxy, etc. It is also known that antimonial compounds improve flame resistance.

However, the halogen based compounds are known to generate gases that corrode the molds during processing and to generate gases toxic to human during combustion.

Particularly, bromine based compounds, which may generate environmental hormones such as dioxin and furan, are regulated by European countries. Also, the antimonial compounds are classified as toxic materials.

DISCLOSURE OF INVENTION

Technical Problem

Thus, many researches are focusing on a flame resistant resin without comprising a halogen compound and antimony. Phosphorus based flame retardants, melamine based flame retardants, etc. are widely used as such materials. But, they do not offer good flame resistance compared with the halogen based compounds.

Technical Solution

It is an aspect of the present invention to provide a nanocomposite thermoplastic resin composition with superior flame resistance, which comprises a resin mixture in which a rubber-modified styrene-containing graft copolymer and a thermoplastic polyamide resin are blended, a melamine based flame retardant and an organic layered silicate.

ADVANTAGEOUS EFFECTS

The present inventors completed the present invention by inventing a nanocomposite thermoplastic resin composition with improved flame resistance and physical properties by adding a melamine based flame retardant and an organic layered silicate to a resin mixture obtained by blending a rubber-modified styrene-containing graft copolymer and a thermoplastic polyamide resin.

BEST MODE FOR CARRYING OUT THE INVENTION

To attain the aforementioned aspect, the present invention provides a nanocomposite thermoplastic resin composition with flame resistance comprising a) 100 parts by weight of a basic resin mixture comprising 2-79 wt % of a rubber-modified styrene-containing graft copolymer, 18-95 wt % of a thermoplastic polyamide resin and 3-80 wt % of a styrene-containing copolymer;

b) 0.1-15 parts by weight of a compatibilizer;

c) 5-30 parts by weight of a melamine based flame retardant; and d) 0.01-10 parts by weight of an organic layered silicate.

MODE FOR INVENTION

Hereinafter, the present invention is described in more detail.

(1) Rubber-Modified Styrene-Containing Graft Copolymer

The rubber-modified styrene-containing graft copolymer employed in the present invention is a resin prepared by grafting a compound comprising 30-65 wt % of at least one styrenic resin selected from the group consisting of styrene, α-methylstyrene and nucleus-substituted styrene and 10-30 wt % of at least one acrylic resin selected from the group consisting of acrylonitrile, methyl methacrylate and butyl acrylate onto 10-60 wt % of at least one rubber selected from the group consisting of polybutadiene, styrene-butadiene copolymer, polyisoprene and butadiene-isoprene copolymer.

The graft copolymer may be prepared by the common polymerization method, preferably by bulk polymerization or emulsion polymerization. Particularly, an acrylonitrile/butadiene/styrene (ABS) resin prepared by grafting acrylonitrile and styrene onto a butadiene rubber is widely used for such purpose.

Preferably, the rubber-modified styrene-containing graft copolymer is comprised in 2-79 wt % per 100 wt % of the basic resin mixture. If the content of the rubber-modified styrene-containing graft copolymer is below 2 wt %, notch impact strength may decrease. Otherwise, if it exceeds 79 wt %, rigidity and toughness may worsen.

(2) Thermoplastic Polyamide Resin

The polyamide resin employed in the present invention is nylon 6, nylon 46, nylon 66, nylon 69, nylon 610, nylon 6/66, nylon 612, nylon 611, nylon 11, nylon 12, nylon 61, nylon 6T,/6I, nylon 66/6T, polybis(4-aminocyclohexyl)methane dodecamide (nylon PACM12), polybis(3-methyl-4-aminocyclohexyl)methane dodecamide (nylon dimethyl PACM12), poly m-xylene adipamide (MXD6), polyundecamethylene terephthalamide (nylon 11T) or polyandecamethylene hexahydroterephthalamide (nylon 11T(H)). Here, I represents isophthalic acid and T represents terephthalic acid. Mixtures or copolymers of the aforementioned compounds may also be used.

Of the aforementioned polyamides, nylon 6, nylon 46, nylon 66, nylon 11, nylon 12, nylon 610, mixtures thereof or copolymers thereof are more preferable. Particularly, nylon 6 is the most preferable.

Considering the mechanical, thermal and chemical properties offered by the polyamide, the polyamide preferably has a relative viscosity of 1.5-5.0. If the relative viscosity is below 1.5, it is difficult to obtain ideal physical properties. Otherwise, if the relative viscosity is higher than 5.0, manufacture cost may rises and processing becomes difficult. Approximate degree of polymerization may be determined by measuring the relative viscosity of the polyamide.

The polyamide is comprised in 18-95 wt % per 100 wt % of the basic resin. If the content of the polyamide is below 18 wt %, mechanical property may worsen. Otherwise, if it exceeds 95 wt %, notch impact strength may worsen.

If necessary, the polyamide may be copolymerized with other copolymerizable component.

The polyamide employed in the present invention may be prepared by melt polymerization or solid state polymerization.

The polyamide/rubber-modified styrene-containing graft copolymer blend is endowed with a synergic effect of a semi-crystalline polymer and an amorphous polymer by the combination of the polyamide, which offers superior mechanical, thermal and chemical properties, and the rubber-modified styrene-containing copolymer, which offers superior impact characteristic, dimensional stability, adhesivity to paint and appearance.

(3) Styrene-Containing Copolymer

The styrene-containing copolymer employed in the present invention comprises 50-80 wt % of at least one styrenic compound selected from the group consisting of styrene, α-methylstyrene and nucleus-substituted styrene and 20-50 wt % of at least one acrylic compound selected from the group consisting of acrylonitrile, methyl methacrylate and butyl acrylate. The styrene-containing copolymer is comprised in 3-80 wt % per 100 wt % of the basic resin. If the content of the styrene-containing copolymer is below 3 wt %, dimensional stability may worsen. Otherwise, if it exceeds 80 wt %, impact strength may decrease.

The main components of the composition of the present invention are the polyamide and the rubber-modified styrene-containing graft copolymer (ABS, ASA, AES, HIPS, etc., mainly ABS). Here, the ABS is usually an interpolymer of a rubber-modified styrene-containing graft copolymer and a styrene-containing copolymer. The former offers impact characteristic and the latter offers rigidity, heat resistance, etc. to the resin composition. The physical properties may be varied by differentiating the proportion of the two components.

(4) Compatibilizer

Examples of the compounds that can be used as compatibilizer in the present invention are a styrene-maleic anhydride copolymer, an acrylonitrile-butadiene-styrene-styrene-maleic anhydride grafting copolymer (ABS-g-MA), or methyl methacrylate(MMA), an acrylonitrile-styrene-maleic anhydride grafting copolymer (AS-g-MA), etc. Among these, a styrene-maleic anhydride copolymer and an acrylonitrile-styrene-maleic anhydride grafting copolymer are more preferable.

For the styrene-maleic anhydride copolymer, styrene treated with maleic anhydride may be used. The styrene-maleic anhydride copolymer (SMA) is compatible with a styrene-containing copolymer or a rubber-modified styrene-containing copolymer. It is also compatible with polyamide because of the reaction shown in Scheme 1 below.

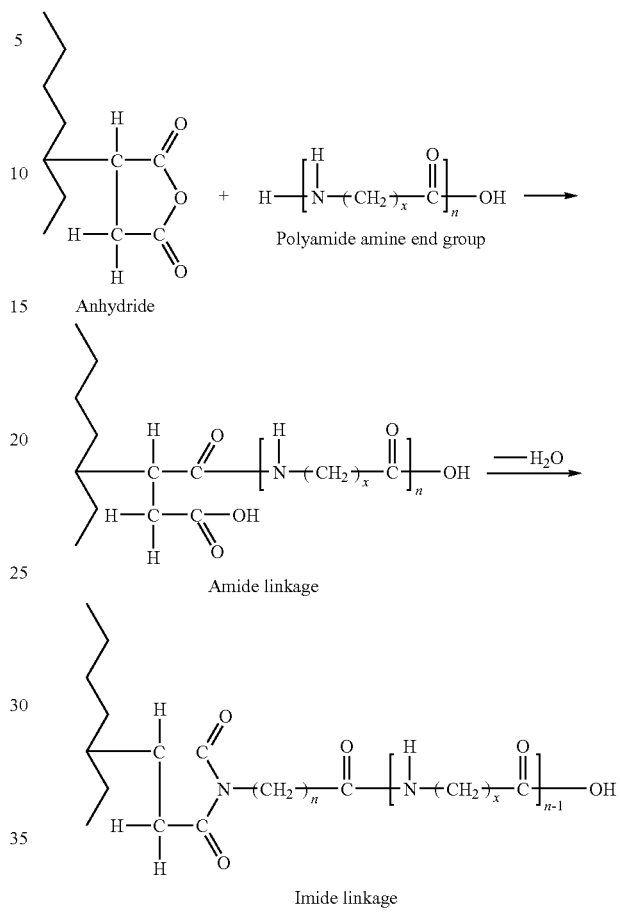

Preferably, the compatibilizer is comprised in 0.1-15 parts by weight per 100 parts by weight of the basic resin. If the compatibilizer is not used, the crystalline polyamide is incompatible with the amorphous rubber-modified styrene-containing graft copolymer. If the content of the compatibilizer exceeds 15 parts by weight, the resin may become overly cross-linked, thereby worsening processability.

(5) Melamine Based Flame Retardant

For the melamine based flame retardant melamine or melamine derivatives, for example, melamine, melamine cyanurate, melamine phosphate, melamine pyrophosphate, melamine polyphosphate, etc., may be used.

Preferably, the melamine based flame retardant is comprised in 5-30 parts by weight per 100 parts by weight of the basic resin. If the content of the melamine based flame retardant is below 5 parts by weight, flame resistance decreases. Otherwise, if it exceeds 30 parts by weight, impact strength decreases.

(6) Organic Layered Silicate

The organic layered silicate employed in the present invention is a layered silicate selected from the group consisting of montmorillonite, hectorite, vermiculite and saponite, which has been treated with an organic modifier. For the organic modifier that facilitates dispersing of the layered silicate in a polymer, alkyl ammoniums, alcohols, ketones, etc. may be used. Preferably, polyvinyl alcohol is used as the organic modifier.

The clay-dispersed nanocomposite manufacturing technique delaminates a layered silicate and disperses it on a polymer resin to get ideal properties.

The nanocomposite thermoplastic resin composition with flame resistance of the present invention may further comprise at least one material selected from the group consisting of a lubricant, a heat stabilizer, an antioxidant, UV-stabilizer, a anti-dripping agent, a pigment and an inorganic filler. The lubricant, heat stabilizer, antioxidant, UV-stabilizer, anti-dripping agent, pigment or inorganic filler may be those commonly used in the related art.

Hereinafter, the present invention is described in more detail through examples. However, the following examples are only for the understanding of the present invention and the present invention is not limited to or by them.

EXAMPLES

Each of the styrenic thermoplastic resins of Examples and Comparative Examples comprises (1) a rubber-modified styrene-containing graft copolymer, (2) a thermoplastic polyamide resin, (3) a styrene-containing copolymer (4) a compatibilizer, (5) a melamine based flame retardant and (6) an organic layered silicate. Each component was prepared as follows.

(1) Rubber-Modified Styrene-Containing Graft Copolymer

A product of LG Chem was used for the rubber-modified styrene-containing graft copolymer. The product was an acrylonitrile/butadiene/styrene resin prepared by grafting acrylonitrile and styrene onto butadiene rubber and it comprised 14 wt % of acrylonitrile, 36 wt % of styrene and 50 wt % of butadiene rubber. It was emulsion polymerized according to the method disclosed in Korea Patent No. 0358231.

(2) Thermoplastic Polyamide Resin

Nylon 6 was prepared by ring-opening polymerization of ϵ-caprolactam in the presence of water.

(3) Styrene-Containing Copolymer

The SAN® product of LG Chem was used for the styrene-containing copolymer.

(4) Compatibilizer

SMA® EF-30 of ATOFINA, which is a styrene-maleic anhydride copolymer, was used for the compatibilizer.

(5) Melamine Based Flame Retardant

Melapur® MC25 (melamine cyanurate) of DSM was used for the melamine based flame retardant.

(6) Organic Layered Silicate 10 g of montmorillonite was dispersed in 1,000 mL of distilled water using a sonicator. 10 g of polyvinyl alcohol having a degree of polymerization of about 600 was completely dissolved in 1,000 mL of distilled water. Then, 1,000 mL of the polyvinyl alcohol solution was added to 1,010 mL of the montmorillonite dispersion solution. After stirring for 3 hours, the mixture solution was dried in a vacuum desiccator. The dried product was crushed to obtain a powder.

Example 1

1 part by weight of SMA® EF-30, a compatibilizer, 5 parts by weight of Melapur® MC25 (melamine cyanurate), a flame retardant, and 1 part by weight of organic layered silicate (PVA-modified-MMT) were used per 100 parts by weight of a resin comprising 14 wt % of a rubber-modified styrene-containing graft copolymer, 65 wt % of a thermoplastic polyamide resin and 21 wt % of a styrene-containing copolymer to prepare a flame resistance thermoplastic resin composition.

Example 2

A flame resistance thermoplastic resin composition was prepared in the same manner of Example 1, except that the content of Melapur® MC25 was increased to 10 parts by weight.

Example 3

A flame resistance thermoplastic resin composition was prepared in the same manner of Example 1, except that 10 parts by weight of SMA® EF-30, 20 parts by weight of Melapur® MC25 (melamine cyanurate) and 5 parts by weight of organic layered silicate were used.

Example 4

A flame resistance thermoplastic resin composition was prepared in the same manner of Example 1, except that 30 parts by weight of Melapur® MC25 (melamine cyanurate) and 5 parts by weight of organic layered silicate were used.

Comparative Example 1

A flame resistance thermoplastic resin composition was prepared in the same manner of Example 1, except that 3 parts by weight of Melapur® MC25 was used.

Comparative Example 2

A flame resistance thermoplastic resin composition was prepared in the same manner of Example 1, except that 35 parts by weight of Melapur® MC25 was used.

Comparative Example 3

A flame resistance thermoplastic resin composition was prepared in the same manner of Example 2, except that no compatibilizer was used.

Comparative Example 4

A flame resistance thermoplastic resin composition was prepared in the same manner of Example 2, except that a resin comprising 40 wt % of a rubber-modified styrene-containing graft copolymer and 60 wt % of a styrene-containing copolymer was used.

Comparative Example 5

A flame resistance thermoplastic resin composition was prepared in the same manner of Example 2, except that no organic layered silicate was used.

Testing Example 1

Tensile strength, impact strength and flame resistance were tested for the samples prepared in Examples 1-4 and Comparative Examples 1-5. The result is given in Table 1 below. Tensile strength was measured according to ASTM D-638, notched izod impact strength according to ASTM D-256, and flame resistance according to the flame resistance standard UL94 VB.

TABLE 1

|  | Example | | | | Comparative Example | | | | |
| --- | --- | --- | --- | --- | --- | --- | --- | --- | --- |
|  | 1 | 2 | 3 | 4 | 1 | 2 | 3 | 4 | 5 |
| Acrylonitrile/butadiene/styrene | 14 | 14 | 14 | 14 | 14 | 14 | 14 | 40 | 14 |
| Polyamide | 65 | 65 | 65 | 65 | 65 | 65 | 65 | — | 65 |
| Styrene-containing copolymer | 21 | 21 | 21 | 21 | 21 | 21 | 21 | 60 | 21 |
| SMA ®EF-30 | 1 | 1 | 10 | 1 | 1 | 1 | — | 1 | 1 |
| Melapur ®MC 25 | 5 | 10 | 20 | 30 | 3 | 35 | 10 | 10 | 10 |
| PVA-modified-MMT | 1 | 1 | 5 | 5 | 1 | 1 | 1 | 1 | — |
| Tensile strength (kg/cm$^2$) | 753 | 742 | 729 | 696 | 761 | 669 | 478 | 521 | 720 |
| Impact strength (¼") | 27 | 24 | 15 | 11 | 21 | 4 | 3 | 26 | 23 |
| Flame resistance (⅛") | V-1 | V-0 | V-0 | V-0 | X | V-0 | V-0 | X | V-1 |

As in Examples 1-4, the flame resistance was superior when a polyamide resin and SMA® EF-30 were blended into a styrenic copolymer and a melamine based flame retardant was added. When the content of the melamine based flame retardant was below 5 parts by weight as in Comparative Example 1, the flame resistance was insufficient. When the content of the melamine based flame retardant exceeded 30 parts by weight as in Comparative Example 2, the flame resistance was superior but the impact strength decreased. When no compatibilizer was used as in Comparative Example 3, the flame resistance was superior but such mechanical strength as tensile strength and impact strength decreased significantly. When the melamine based flame retardant was added to a resin comprising a styrenic copolymer only, as in Comparative Example 4, the flame resistance was insufficient. But, when it was blended with a polyamide resin, as in Example 2, the flame resistance was superior. Comparing the cases of using organic layered silicate (Example 2) and not using it (Comparative Example 5), the flame resistance and the tensile strength were superior when organic layered silicate was used.

INDUSTRIAL APPLICABILITY

As apparent from the above description, the present invention rubber-modified provides a nanocomposite thermoplastic resin composition with superior flame resistance without using a halogen based flame retardant, by adding a compatibilizer, a melamine based flame retardant and an organic layered silicate to a basic resin mixture comprising a styrene-containing graft copolymer, a thermoplastic polyamide resin and a styrene-containing copolymer.

The invention claimed is:

1. A nanocomposite thermoplastic resin composition with flame resistance consisting essentially of:
   a) 100 parts by weight of a basic resin mixture comprising 1-75 wt % of a rubber-modified styrene-containing graft copolymer, 20-95 wt % of a thermoplastic polyamide resin and 5-80 wt % of a styrene-containing copolymer;
   b) 0.1-15 parts by weight of a compatibilizer;
   c) 5-30 parts by weight of a melamine based flame retardant; and
   d) 0.01-10 parts by weight of an organic layered silicate,
   wherein the styrene-containing copolymer consists essentially of 50-80 wt % of at least one compound selected from the group consisting of styrene, α-methylstyrene and nucleus-substituted styrene and 20-50 wt % of at least one compound selected from the group consisting of acrylonitrile, methyl methacrylate and butyl acrylate.

2. The nanocomposite thermoplastic resin composition of claim 1, wherein the rubber-modified styrene-containing graft copolymer comprises 10-60 wt % of at least one rubber selected from the group consisting of polybutadiene, styrene-butadiene copolymer, polyisoprene and butadiene-isoprene copolymer, 30-80 wt % of at least one graft monomer selected from the group consisting of styrene, α-methylstyrene and nucleus-substituted styrene and 10-60 wt % of at least one graft monomer selected from the group consisting of acrylonitrile, methyl methacrylate and butyl acrylate.

3. The nanocomposite thermoplastic resin composition of claim 1, wherein the thermoplastic polyamide resin comprises a polymer having a relative viscosity of 1.5-5.0.

4. The nanocomposite thermoplastic resin composition of claim 1, wherein the compatibilizer is at least one selected from the group consisting of a styrene-maleic anhydride copolymer, an acrylonitrile-butadiene-styrene-maleic anhydride grafting copolymer (ABS-g-MA), methyl methacrylate (MMA) and an acrylonitrile-styrene-maleic anhydride grafting copolymer (AS-g-MA).

5. The nanocomposite thermoplastic resin composition of claim 1, wherein the melamine based flame retardant is at least one selected from the group consisting of melamine, melamine cyanurate, melamine phosphate, melamine pyrophosphate and melamine polyphosphate.

6. The nanocomposite thermoplastic resin composition of claim 1, wherein the organic layered silicate is selected from the group consisting of montmorillonite, hectorite, vermiculite and saponite which has been organified by an organifying agent selected from the group consisting of alkyl ammoniums, alcohols having a degree of polymerization of 5-1,000 and ketones.

7. The nanocomposite thermoplastic resin composition of claim 1, which further comprises a lubricant, a heat stabilizer, an antioxidant, a photostabilizer, a dripping retardant, a pigment and an inorganic filler.

8. A nanocomposite thermoplastic resin composition with flame resistance comprising
   a) 100 parts by weight of a basic resin mixture comprising 1-75 wt % of a rubber-modified styrene-containing graft copolymer, 20-95 wt % of a thermoplastic polyamide resin and 5-80 wt % of a styrene-containing copolymer;
   b) 0.1-15 parts by weight of a compatibilizer;
   c) 5-30 parts by weight of melamine cyanurate as a flame retardant; and
   d) 0.01-10 parts by weight of an organic layered silicate.

* * * * *